US011958027B2

(12) United States Patent
Buss et al.

(10) Patent No.: US 11,958,027 B2
(45) Date of Patent: Apr. 16, 2024

(54) RE-MIXING DISPENSER FOR LIQUIDS IN PLUNGER TUBES

(71) Applicant: Southwest Research Institute, San Antonio, TX (US)

(72) Inventors: Cole Buss, San Antonio, TX (US); Eric Kroeger, San Antonio, TX (US); Taylor W. Batholomew, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 140 days.

(21) Appl. No.: 17/062,807

(22) Filed: Oct. 5, 2020

(65) Prior Publication Data

US 2022/0105479 A1 Apr. 7, 2022

(51) Int. Cl.

| | |
|---|---|
| ***B01F 13/00*** | (2006.01) |
| ***B01F 33/501*** | (2022.01) |
| ***B65D 1/04*** | (2006.01) |
| ***B65D 81/32*** | (2006.01) |
| ***B65D 83/00*** | (2006.01) |
| *B01F 101/00* | (2022.01) |

(52) U.S. Cl.

CPC .......... *B01F 33/50114* (2022.01); *B65D 1/04* (2013.01); *B65D 81/325* (2013.01); *B65D 81/3283* (2013.01); *B65D 83/0005* (2013.01); *B01F 2101/2305* (2022.01)

(58) Field of Classification Search

CPC ............ B01F 33/5011; B01F 33/50111; B01F 33/50114; B01F 2101/2305; B65D 81/325; B65D 83/68; B65D 1/04; B65D 81/3283; B65D 83/0005

USPC .................................................. 222/135, 137

See application file for complete search history.

(56) References Cited

U.S. PATENT DOCUMENTS

| | | | | |
|---|---|---|---|---|
| 3,164,303 A * | 1/1965 | Trautmann | A61M 5/284 | 222/386 |
| 3,475,010 A * | 10/1969 | Moline | B01F 35/7137 | 222/136 |
| 4,371,094 A * | 2/1983 | Hutter, III | B01F 33/50112 | 222/1 |
| 4,469,153 A * | 9/1984 | Morrisette | B01F 35/7174 | 92/255 |
| 5,829,875 A * | 11/1998 | Hagel | B65D 83/0005 | 222/386 |
| 6,402,364 B1 * | 6/2002 | Esclar | B01F 31/441 | 366/276 |
| 7,736,049 B2 * | 6/2010 | Keller | B01F 35/71 | 366/155.1 |
| 2005/0105385 A1 * | 5/2005 | McGill | B01F 35/713 | 366/139 |

(Continued)

*Primary Examiner* — Ishal Pancholi
*Assistant Examiner* — Robert K Nichols, II
(74) *Attorney, Agent, or Firm* — Livingston Law Firm

(57) ABSTRACT

A re-mixing dispenser for containing and dispensing a liquid. The dispenser may have one or more tubes, each containing a different liquid. At least one of the liquids may be re-mixed in situ, using a special two-piece plunger and plunger rod. A mixing piece of the two-piece plunger is moveable independently of a top piece and has blades that allow it to move through the liquid. A plunger rod is removably attached to the mixing piece and is operable to move the mixing piece up and down within the tube during mixing. The two plunger pieces are joined and moved as a single plunger during dispensing.

6 Claims, 7 Drawing Sheets

(56) References Cited

U.S. PATENT DOCUMENTS

2014/0098629 A1* 4/2014 Greter .................... B01F 35/30
366/184

* cited by examiner

RE-MIXING DISPENSER FOR LIQUIDS IN PLUNGER TUBES

GOVERNMENT SUPPORT CLAUSE

This invention was made with United States Government Support under Contract No. H98230-19-C-0344 funded by the Maryland Procurement Office. The Government has certain rights in this invention.

TECHNICAL FIELD OF THE INVENTION

This invention relates to dispensers for liquids sold in plunger tubes, and more particularly to such liquids that require re-mixing before use.

BACKGROUND OF THE INVENTION

Epoxy glues are one example of a product in which two liquids are mixed at the time of use but must be contained separately until that time. Examples of such "two-part liquids" are epoxies comprising a resin and hardener, silicones comprising a catalyst and resin, and other products having thermosetting reactants.

Often, the two-part liquid is sold in a double-tube dispenser. Each tube has a plunger to push the stored liquid through a dispenser hole at the other end.

The double-tube dispensers may be sold as part of a dispenser pump-gun or may be designed to be subsequently loaded into a dispenser gun. In either case, at the time of use, the end user operates the dispenser pump-gun so as to simultaneously depress both plungers. This action pushes both liquids out of the double-tube dispenser, through a simple mixer, and out from a nozzle.

A problem with conventional double-tube dispensers is that if one of the liquid components has additives, such additives may separate and settle over time during storage prior to use. This can result in an inconsistent appearance among tubes and over the course of use of a single dispenser tube. This rendered the product unusable for the intended application. The current process requires removing the settled component from the tube, remixing it, and adding it back to the tube to be used.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a dispenser designed to re-mix the components contained in a tube, syringe, or other plunger-operated container that dispenses a product in liquid form. For purposes of this description, such containers are generally referred to as "plunger tubes".

The dispenser allows the user to re-mix a component that has settled while the component has been kept in its plunger tube. It can also be used to initially mix the components in the tube. The mixing is in-situ, meaning that the liquid remains in its tube during mixing.

Multi-Tube Dispensers

This section is directed to a double-tube dispenser designed to re-mix one of the components of a multi-component liquid. As indicated in the Background, two-part liquids are used for many epoxy products, but the same concepts may apply to any "multi-component" liquid.

In the example of this description, the multi-component liquid is a two-part epoxy that contains soluble and non-soluble material additives. The mixing is applied to the epoxy resin. However, the invention described herein can be used with any multi-component liquid, without departing from the scope of the invention.

Figure 1:
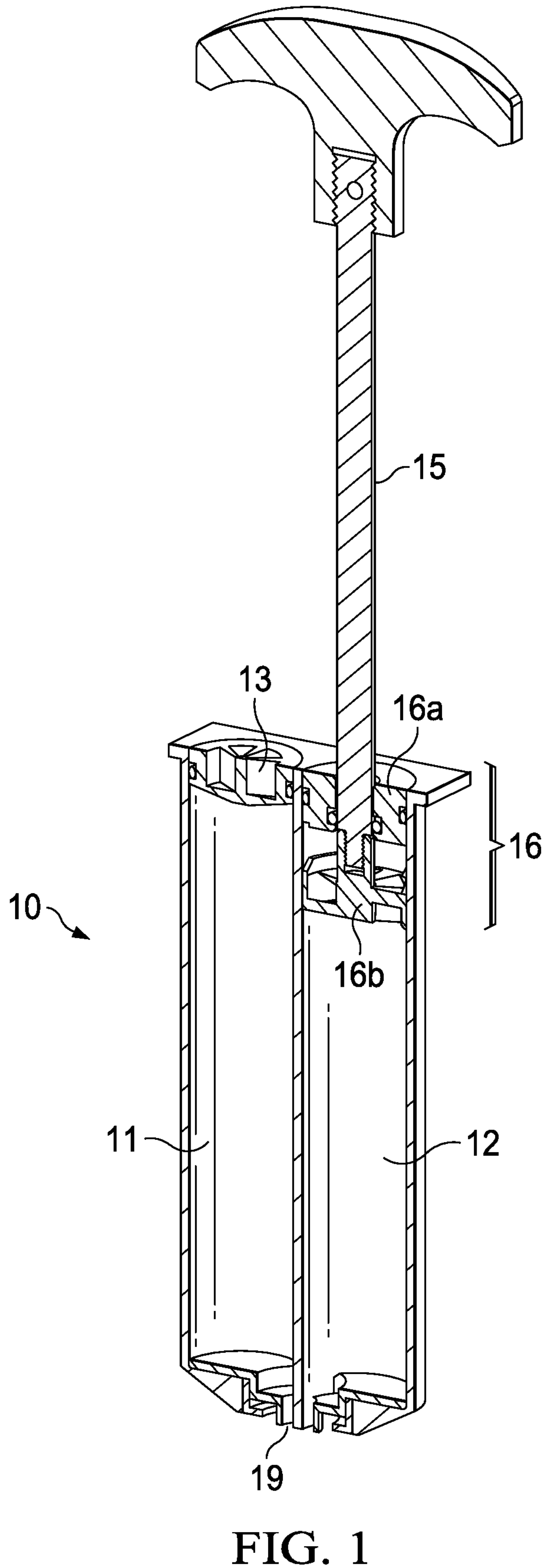
FIG. 1 is a cut-away view of a plunger dispenser for two-part liquids.

FIG. 1 is a cut away view of the dispenser 10 for multi-component liquids. Here, the dispenser has two tubes 11 and 12, each for storing one component of a two-part epoxy.

Tubes 11 and 12 are arranged parallel to each other. They are adjoined or otherwise in a permanent rigid pairing. They are typically the same length and share a bottom opening 19. Otherwise, they are generally the same size and shape, but the size and shape of one may vary slightly from the other.

As explained below, both tubes 11 and 12 have a plunger 13 and 16, respectively. However, the plunger 16 of tube 12 is a two-piece plunger. In the example of this description, where the two-part liquid is an epoxy and the liquid components are resin and hardener, the resin is a "settling liquid" that often needs re-mixing before use. The two-piece plunger 16 is used with this "settling liquid".

A first tube 11, here the epoxy's hardener tube, has a plunger 13 that remains at its top end until the two-part liquid is dispensed. Plunger 13 has a sealed fit to the inner diameter of tube 11 but is slidable downward into the tube 11 to push the liquid out of the tube through dispenser opening 19. Plunger is designed to accept the plunger rod of a conventional dispenser gun.

The second tube 12 has a special plunger rod 15 and a two-piece plunger 16. As explained below, plunger rod 15 and two-piece plunger 16 are used for purposes of re-mixing the contents of tube 12 in situ. The plunger rod 15 has a handle to aid in the mixing. After re-mixing, plunger rod 15 is detached, and plunger 16 remains to serve as a plunger for a dispenser pump-gun, operating in a manner similar to plunger 13.

Figure 1A:
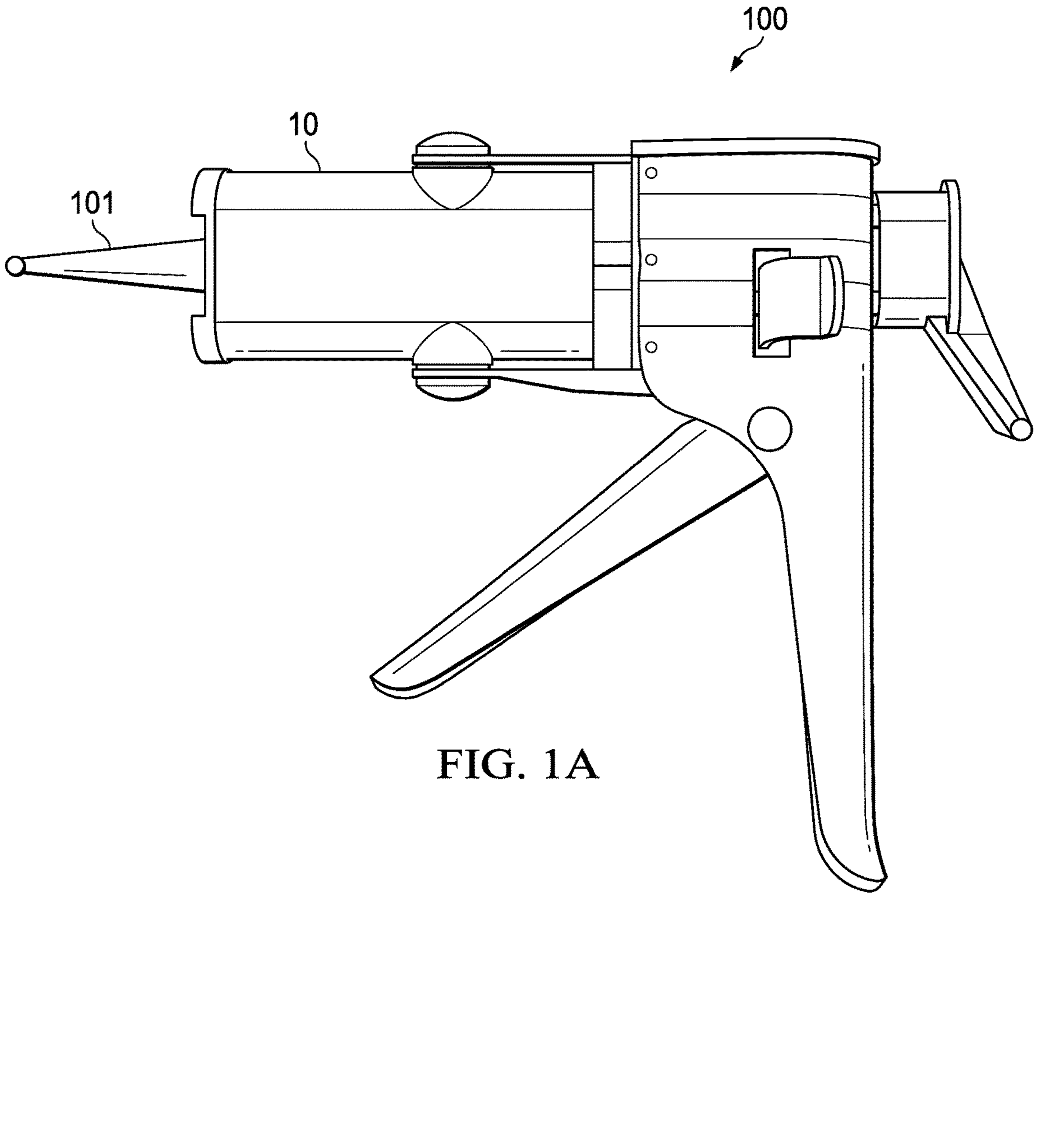
FIG. 1A illustrates a plunger dispenser loaded into a pump-gun.

FIG. 1A illustrates a dispenser pump-gun 100 with dispenser 10 loaded into the gun. As indicated in the Background, double-tube dispensers such as dispenser 10 may be sold as an integral part of a disposable dispenser pump-gun or may be loaded into a re-usable dispenser pump-gun. If dispenser 10 is integrated into a dispenser pump-gun, it is assumed that the pump-gun is designed to allow dispenser 10 to be operated for mixing as described herein.

In FIG. 1A, plunger rod 15 has been removed and the pump-gun 100 may be used to move the dispenser's plungers. When manually operated by the end user, the dispenser gun 100 simultaneously depresses the plungers, forcing the liquid through nozzle 101.

Figure 2:
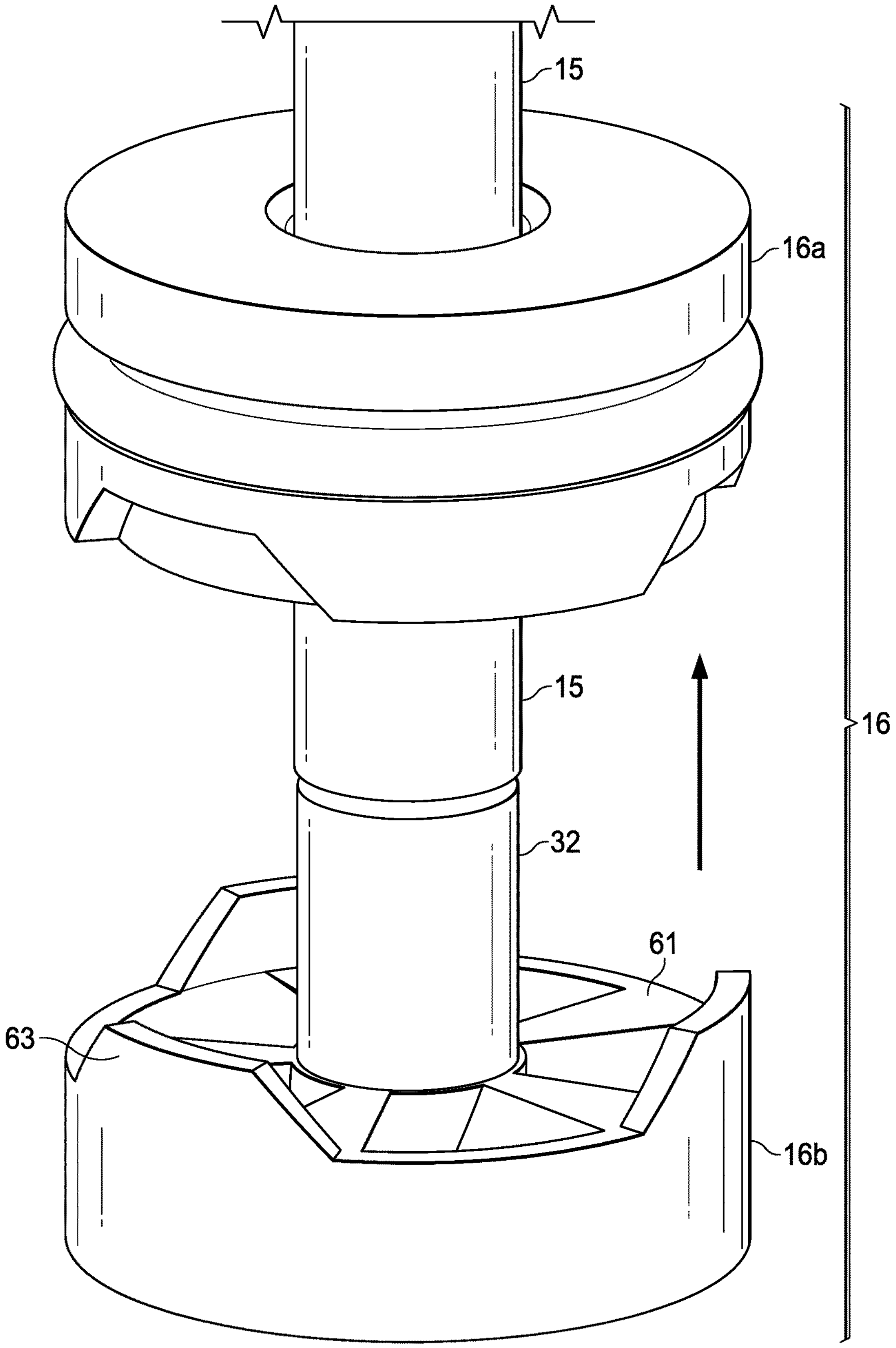
FIG. 2 is a perspective view of the two-piece plunger of FIG. 1.
Figure 3:
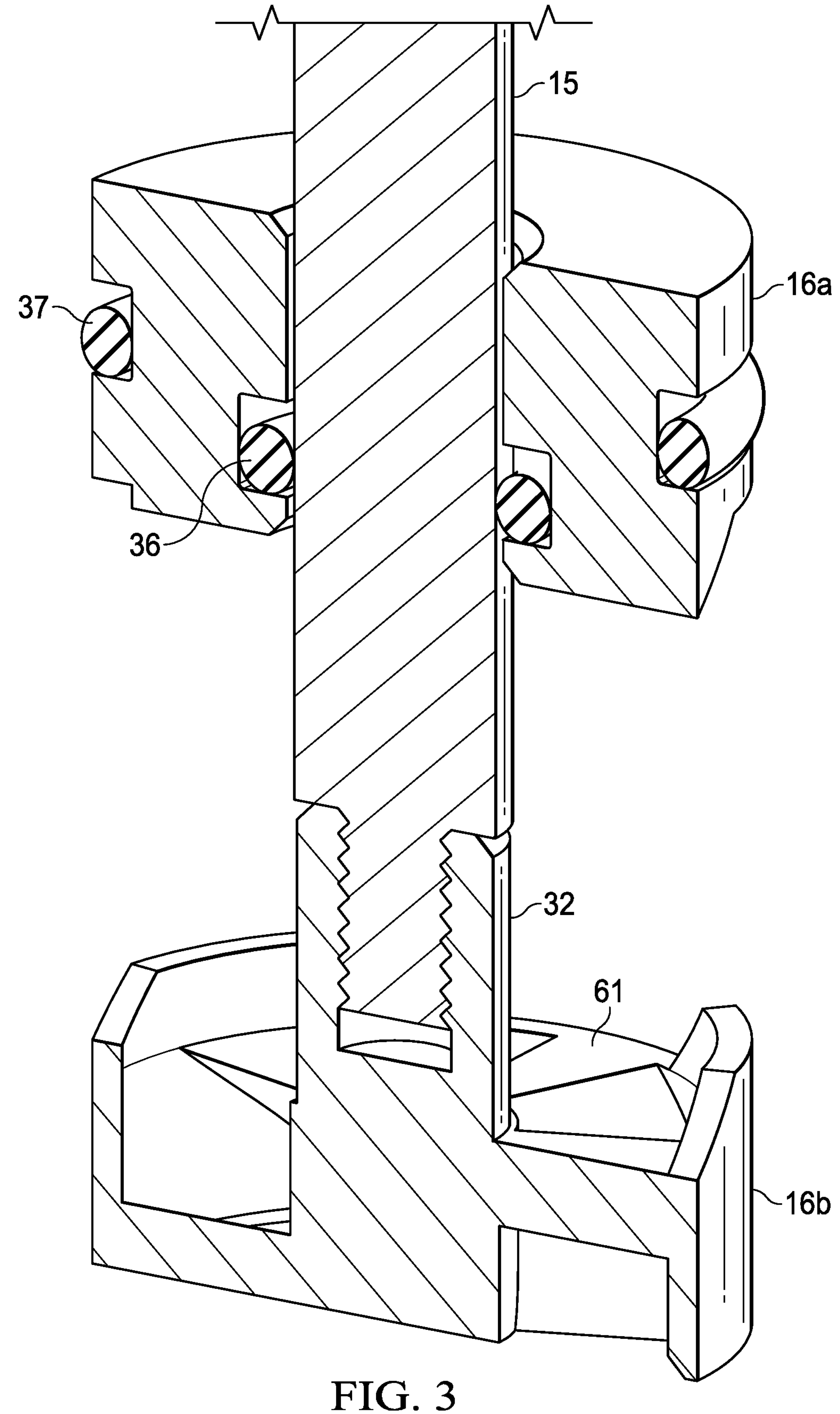
FIG. 3 is a cross-section view of the two-piece plunger of FIG. 1.

FIGS. 2 and 3 illustrate two-piece plunger 16 in further detail. FIG. 2 is a perspective view and FIG. 3 is a cross-sectional view.

The two-piece plunger 16 comprises a top piece 16*a* and mixer piece 16*b*. Two-piece plunger 16 allows re-mixer piece 16*b* to separate from top piece 16*a* for mixing. In FIGS. 2 and 3, they are only slightly separated, but as explained herein, mixer piece 16*b* may be moved all the way to the bottom of tube 12. After re-mixing, the two pieces 16*a* and 16*b* become adjacent to each other so that plunger 16 operates as a single plunger when the two-part liquid is ready to be dispensed.

As shown in FIG. 3, mixer piece 16*b* has a center connecter 32 with inner threading. The threaded bottom end of plunger rod 15 is threaded into or out of connector 32. This allows plunger rod 15 to be attached to mixer piece 16*b* for mixing and detached after mixing.

Figure 4:
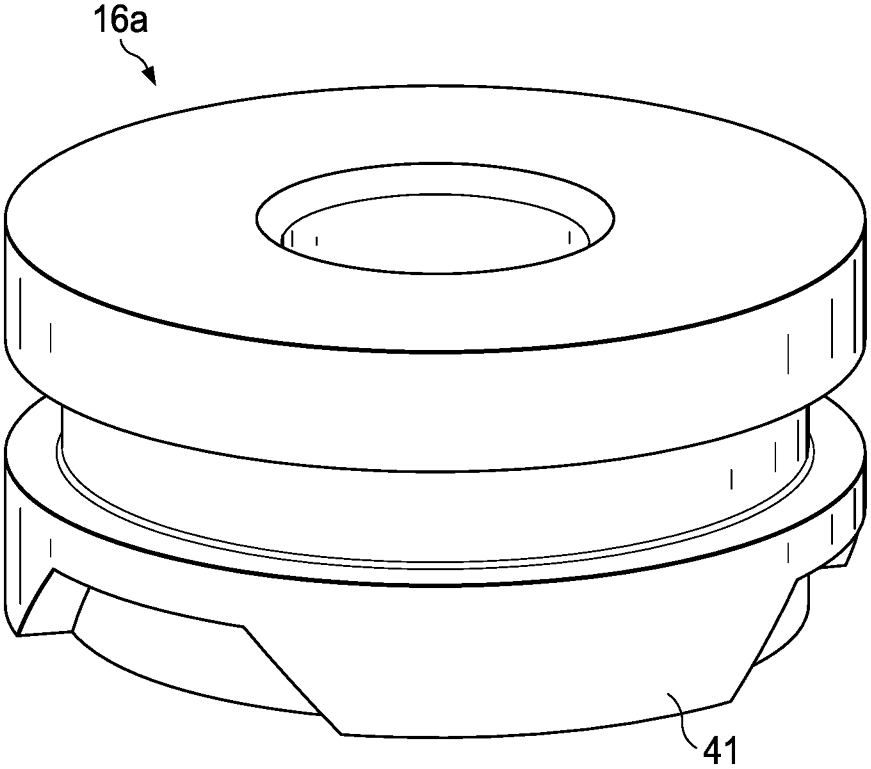
FIG. 4 is a perspective view of the top piece of the two-piece plunger.
Figure 5:
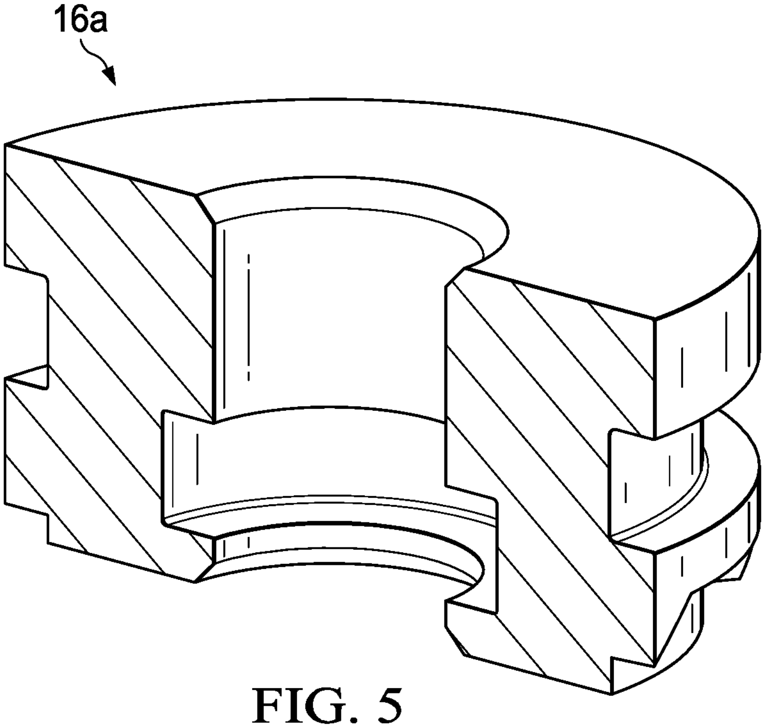
FIG. 5 is a cross-section view of the top piece of the two-piece plunger.

FIGS. 4 and 5 illustrate top piece 16*a* in further detail. FIG. 4 is a perspective view and FIG. 5 is a cross-sectional view.

Top piece 16*a* is generally solid except for a hole that allows the plunger rod to pass through to the mixer piece 16*b*. Its outer shape conforms to that of its associated tube 12 so that it may properly act as a plunger.

Top piece 16*a* also has grooves for inner and outer O-ring seals, illustrated in FIG. 3 as o-ring seals 36 and 37. A first seal 36 seals the top piece 16*a* against plunger rod 15, but allows plunger rod 15 to move during mixing. A second seal 37 seals the top piece 16*a* against the inner wall of tube 12 but allows plunger 16 to move during dispensing. The seals 36 and 37 keep the liquid contained within in tube 12 during mixing and dispensing.

Figure 6:
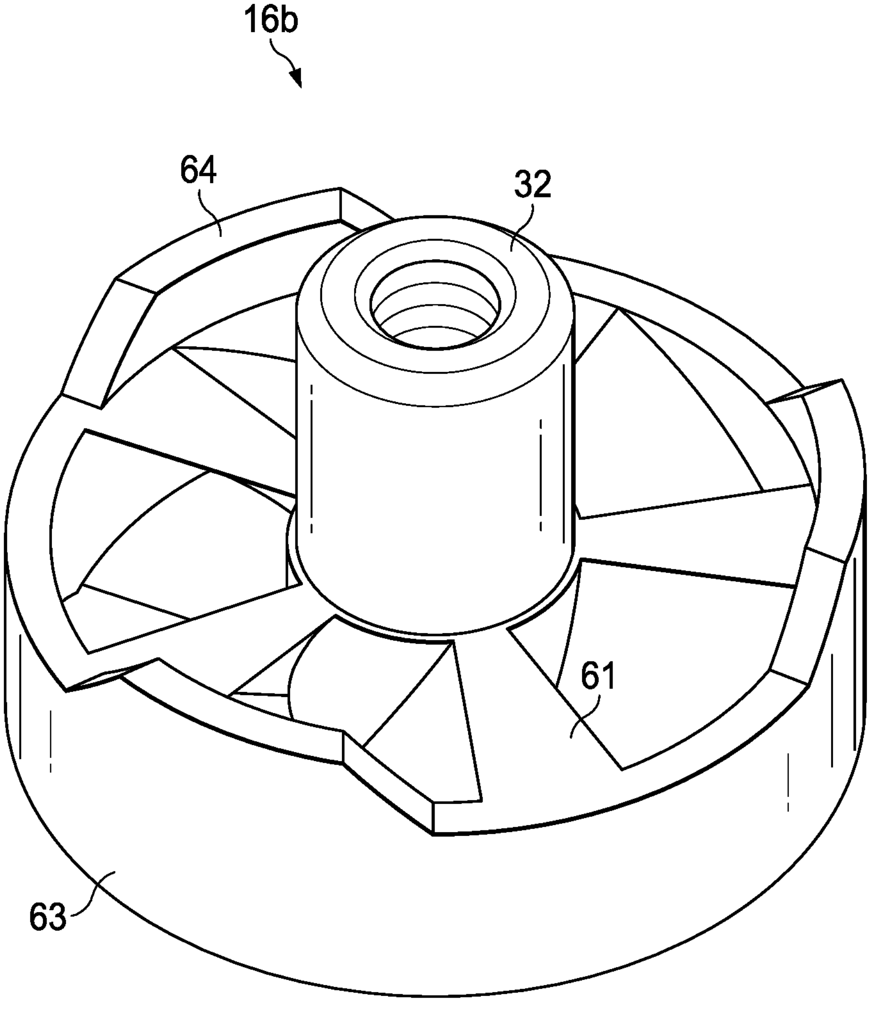
FIG. 6 is a perspective view the re-mixer piece of the two-piece plunger.

FIG. 6 is a perspective view of re-mixer piece 16*b*. As stated above, a threaded connector 32 accepts the threaded bottom of plunger rod 15.

The re-mixer piece 16*b* has fan-blade shaped mixing vanes 61. In the example of FIG. 5 these vanes are radial in design, but other vanes or blades may be used. For example, the blades may have a grill or mesh configuration. A common feature is that the vanes allow liquid to move through the mixer piece, while providing a mixing disturbance of the liquid.

An outer rim 63 wipes settled material away from the inner wall of tube 12 when plunger rod 15 is moved up and down within tube 12. The re-mixer piece 16*b* swirl-mixes the material in tube 12 over a number of passes.

Re-mixer piece 16*b* further has raised features 64 on the top of rim 63. Referring to both FIGS. 4 and 6, these raised features 64 interlock with raised features 41 on the bottom outer edge of top piece 16*a* during threading and unthreading of plunger rod 15. The raised features 64 and 41 are staggered to allow the interlocking and to allow mixer piece 16*b* to be pulled up adjacent to top piece 16*a* after mixing.

In operation, the user pushes the plunger rod 15 through the center hole in the dispenser plunger 16*a*. The user then screws the threaded end of the plunger rod 15 into the threaded insert 32 of the re-mixer plunger 16*b*. The user moves the plunger rod 15 back and forth along the entire length of tube 12, causing the mixer piece 16*b* to mix the liquid within the tube 12. The top piece 16*a* remains at the top of tube 12 due to the friction of the o-ring seal 37, which is greater than the friction of the o-ring seal 36.

After mixing, the user pulls the mixer piece 16*b* up toward the top of tube 12 until it interfaces with and rests against top piece 16*a*. Referring again to FIG. 1, the two pieces of plunger 16 are shown as slightly separated, but the opening in top piece 16*a* and the interlocking bottom and top of pieces 16*a* and 16*b* respectively allow the top piece 16*a* and mixer piece 16*b* to be joined against each other. This is indicated by the arrow in FIG. 2. Once joined, the two pieces of plunger move as a single plunger 16 for dispensing the liquid from the tube 12.

After mixing and interfacing mixer piece 16*b* with top piece 16*a* at the top of tube 16, the user unthreads the plunger rod 15 and puts it aside. The user can then use dispenser 10 with a dispenser pump-gun. In the case of a separate dispenser, the user loads the dispenser 10 into a pump-gun and uses the pump-gun as directed.

Single-Tube Dispensers

Figure 7:
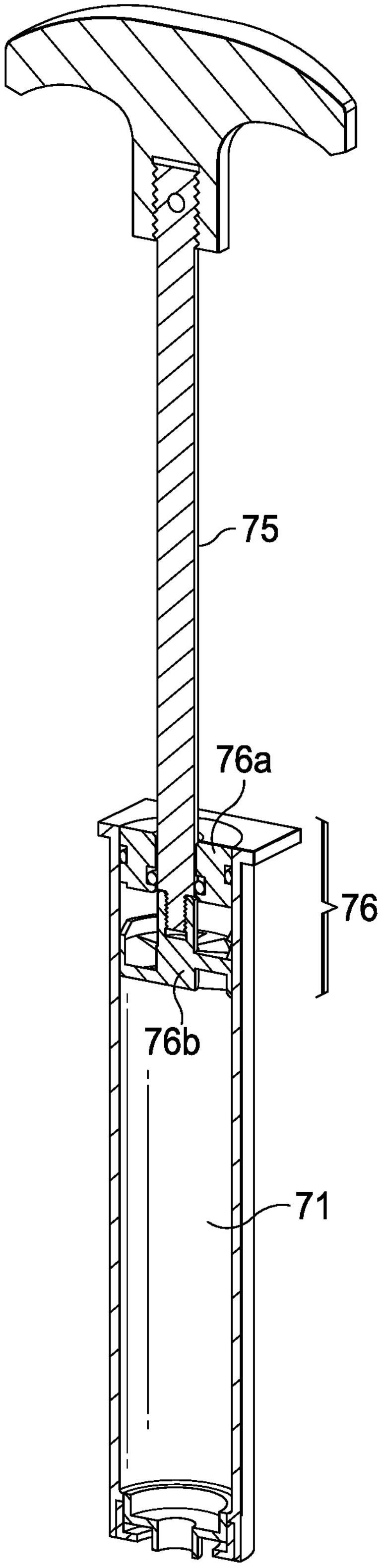
FIG. 7 is a cut-away view of plunger dispenser for a single liquid product.

FIG. 7 illustrates a single-tube embodiment 70 of the re-mixing plunger dispenser. Like dispenser 10 described dispenser 70 is marketed and sold containing a liquid whose components may settle or otherwise require re-mixing before use.

A single tube 71 contains the liquid. Tube 71 is typically round, such as the barrel of a syringe, but may be various elongated shapes.

Dispenser 71 has a two-piece plunger 76, having a top piece 76*a* and a re-mixer piece 76*b*. Together with rod 75, these three pieces operate in the same manner as the rod 15 and plunger 16 described above. After re-mixing, the user pulls the plunger rod 75 up so that the pieces of plunger 76 interlock.

Dispenser 71 may or may not be designed to be loaded into a dispenser pump-gun, such as that of FIG. 1A. In some embodiments, a small syringe-type dispenser may have its contents easily dispensed by using a simple pushing piece to push against the top of plunger 76. In some embodiments, re-mixing rod 75 could be adapted to push against the top of the plunger 76 to serve as this pushing piece.

What is claimed is:

1. A re-mixing dispenser for containing, mixing, and dispensing multi-component liquids, comprising:

a mixing tube for containing a first one of the multi-component liquids that is to be mixed within that tube prior to dispensing;

an additional tube operable to allow its entire contents to remain undisturbed in the additional tube until those contents are dispensed out of the mixer;

wherein the mixing tube and the additional tube each have a top end and a dispensing end in fluid communication with a shared dispenser opening that provides the sole exit for liquids from their respective tubes and from the dispenser, such that the contents of the mixing tube and the additional tube are combined while exiting their respective tubes;

a plunger at the top end of each tube;

wherein the plunger of the mixing tube is a two-piece plunger having a top piece and a mixing piece below the top piece;

wherein the top piece provides a seal of the liquid to maintain all of the liquid in the mixing tube between the top piece and the bottom end at all times prior to, during, and after mixing and as the liquid is dispensed;

wherein the mixing piece is movable independently of the top piece and has blades that allow the mixing piece to move through the liquid; and a plunger rod configured to pass through the top piece and to be removably attached to the mixing piece such that the plunger rod is operable to move the mixing piece up and down within the mixing tube and to be removed from the mixing piece after mixing such that a different plunger may push down on the top piece for dispensing the contents of both tubes out of the dispenser.

2. The re-mixing dispenser of claim 1, wherein the top piece has a hole through which the plunger rod is inserted when attached to the mixing piece.

3. The re-mixing dispenser of claim 1, wherein the blades have a radial vane configuration.

4. The re-mixing dispenser of claim 1, wherein the plunger rod is attached to the mixing piece by means of a threaded attachment.

5. The re-mixing dispenser of claim 1, wherein the mixing piece has an outer rim operable to wipe the liquid away from the inner wall of the tube when the plunger rod is moved up and down within the tube.

6. The re-mixing dispenser of claim 1, wherein the top piece and the mixing piece have interfacing rims and have interlocking raised features on the interfacing rims.

* * * * *